July 15, 1969     W. P. BAZINET, JR     3,455,666

METHOD OF MAKING LASER COMPONENTS

Filed May 6, 1966     2 Sheets-Sheet 1

INVENTOR.
WILFRED P. BAZINET JR.
BY
ATTORNEY

July 15, 1969 W. P. BAZINET, JR 3,455,666
METHOD OF MAKING LASER COMPONENTS
Filed May 6, 1966 2 Sheets-Sheet 2

INVENTOR.
WILFRED P. BAZINET JR.
BY
ATTORNEY

United States Patent Office 3,455,666
Patented July 15, 1969

3,455,666
METHOD OF MAKING LASER COMPONENTS
Wilfred P. Bazinet, Jr., Webster, Mass., assignor, by mesne assignments, to American Optical Corporation, a corporation of Delaware
Filed May 6, 1966, Ser. No. 548,177
Int. Cl. C03b 37/00
U.S. Cl. 65—4                                  4 Claims

ABSTRACT OF THE DISCLOSURE

Method of making unitary laser component comprising forming flash tube compartment and solid laser light-producing means immersed in glass and having related sizes and spacings, and drawing same down to form elongated components of materially reduced size without loss of initial relationship.

---

This invention relates to a method of making laser components for use in laser light-generating and laser light-amplifying structures and the like.

More particularly, the invention relates to an efficient and economical method of making thin, elongated unitary integral rod-like and fiber-like laser components, and the like, which are of such carefully controlled and related cross-sectional dimensions, contour and character as to have high operating efficiencies and high heat conductivity when in use in continuously operated or rapidly pulsed laser structures and the like, each such component comprising a main body member formed of transparent glass of a first predetermined type or types having immersed therein and in good optical contact therewith a rod-like or fiber-like laser element of desired cross-sectional size and formed of a glass of a second predetermined type containing an active laser ingredient dispersed therein, said main body member also having formed therein in closely adjacent controlled and substantially parallel relation to said laser element a smooth hollow elongated cylindrical bore of desired cross-sectional size so as to serve as an immersed flashtube compartment within the finished laser structure formed therefrom.

Unitary laser components formed by following the method steps of the present invention have cross-sectional dimensions and contour of such carefully controlled optical and physical characteristics and finished surface conditions as to serve as efficient means for directing pumping optical energy when generated within said immersed compartment with a minimum amount of reflections into said laser element also immersed within the component and while the glasses forming said main body member and said laser element provide efficient paths for rapidly conducting the heat generated within said component, during laser operation, to exterior portions thereof.

More specifically, the method comprises, among other things, the steps of forming a unitary block-like member of appreciable size of a selected glass or glasses of predetermined optical and physical characteristics and providing in said block-like member a pair of cylindrical holes or bores therein having diameters of related sizes, and which bores extend in substantially parallel relation to each other throughout the entire length of said block and in suitable spaced relation to each other. Following this, the interior side walls or surface portions of said holes or bores are smoothly finished throughout their lengths, as by grinding and polishing or the like. An exterior finished side wall surface of desired size and contour is formed upon this block and thereafter, a carefully prepared laser rod of closely matching diameter and polished exterior is inserted in one of said bores. The assembly so produced is then heated at one end and drawn down in one or more steps and preferably with the use of a vacuum to a smaller final cross-sectional size.

It is, accordingly, an object of the present invention to provide a method whereby thin, elongated unitary laser components having high operating efficiencies and good heat conduction during laser operation and formed of different selected glasses may be produced in an efficient and economical fashion, and with said components each comprising a rod-like or fiber-like element of laserable glass embedded within a main body member formed of a different type of glass or glasses, the glass of said main body member serving not only to completely immerse the rod-like or fiber-like laser element therein but also having an elongated bore immersed therein in such a manner as to serve as a flashtube compartment, whereby light generated within said compartment may be efficiently directed with a minimum of reflections into said laser element thereof and, at the same time, heat generated within the component efficiently conducted to exterior portions thereof.

Other objects and advantages of the present invention will become apparent from the detailed description which follows when taken in conjunction with the accompanying drawings in which.

Figure 1:
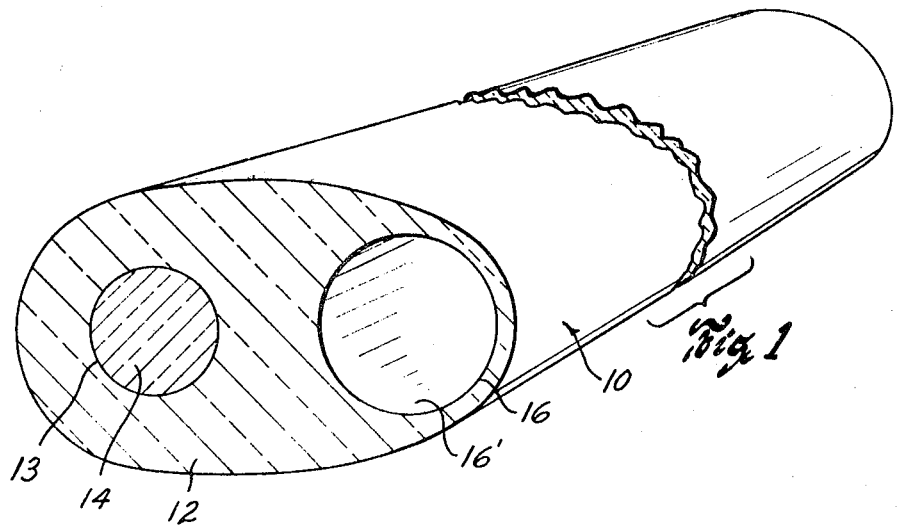
FIG. 1 is a perspective view of a laser component which may be produced by following method steps of the present invention.

Referring to the drawings in detail and, in particular FIG. 1, it will be seen that the numeral 10 indicates generally a unitary laser component of relatively small cross-sectional size and of appreciable length and comprising a thin, elongated main body member 12 formed of a transparent glass of a first type having a predetermined refractive index value and of such other optical and physical characteristics as to be compatible with the particular laser glass to be used therewith, and transparent to optical energy at at least certain preselected pumping wavelengths to be employed therewith when side-pumping to energize the laser glass is used. Embedded within this elongated main body member 12 and extending throughout the length thereof is a rod-like, or fiber-like, element 14 formed of laser glass of known kind (such as neodymium-doped barium crown laser glass, or an erbium-ytterbium-neodymium-doped laser glass, or an erbium-neodymium-doped laser glass or the like) and also having a predetermined refractive index value.

Note that the predetermined refractive index value of the glass of the main body member 12 is carefully chosen relative to the index of the laser glass of the rod or fiber 14 so as to provide at an optical interface 13 therebetween a refractive index difference of desired controlled value. Also note that it is desirable to form this optical interface so as to be of good optical quality free from irregularities, inclusions, bubbles and the like.

In certain cases, the refractive index value of the laser glass may be appreciably greater than that employed for the main body member 12 (which body member, in effect, is also serving as a surrounding protective cladding material for the laser rod or fiber as well as means providing mechanical strength therefor). A large refractive index difference between the laser element and the lower index surround cladding glass will be employed when laser emission is desired but selected mode propagation is not a material factor. However, at other times, it may be preferable for certain purposes, such as for lower order mode propagation, to have this cladding glass of only a very slightly lesser refractive index value than that of the core glass. And, at still other times and for other purposes, such as when a second outer cladding is also being used even a slightly greater refractive index value for the cladding glass relative to the laser glass may be desired. A careful choice of these glasses with these conditions in mind will care for these different arrangements.

Also contained within the main body member 12 of the finished component and extending in the longitudinal direction thereof in such a manner as to be closely adjacent and in side-by-side substantially parallel relation to the laser rod or fiber element 14 is a hollow cylindrical bore 16. This bore 16 is provided with a highly polished cylindrically-shaped interior wall surface 16'. In the finished laser structure, this bore would be closed at its opposite ends by suitable means (not shown) so as to form a gas-tight chamber or compartment substantially immersed within the glass thereof and within which an ionizable gas, or mixture of such gases, such as xenon, argon, helium and the like at suitable operating pressure will be contained. Such a structural arrangement will function in known manner as flashtube light source means when suitably energized by a high potential electric charge effected between a pair of spaced electrodes, not shown, extending into said chamber. A laser structure of the highly efficient type being referred to herein is more fully disclosed and claimed in co-pending application Ser. No. 539,041, filed Mar. 31, 1966.

A sizable block of glass of desired shape and intended for use in the manufacture of laser components of the type shown at 10 in FIG. 1 and containing two polished cylindrical bores or holes in adjacent spaced parallel relation to each other may be conveniently and accurately formed in either of two ways. For example, a first procedure would comprise, as suggested in FIG. 2, to provide a first elongated tubular member 20 of appreciable cross-sectional area and substantial length and having suitably related cross-sectional dimensions for the outside and inside diameters thereof, and also to provide adjacent thereto a second elongated tubular member 24 of appreciable cross-sectional area and length and having suitably related cross-sectional dimensions for the outside and inside diameters thereof.

Both of said tubular members 20 and 24 are preferably formed of the same kind of glass so as to have the same refractive index. Thus, when same are later fused together to produce a unitary structure, it will be substantially free of interfacial conditions at the junction between these two parts. Also, careful consideration is given to the transparency of the glass being used to form these tubular members with reference to the optical pumping wavelengths to be transmitted therethrough. Flat surfaces of suitable size are then ground and polished upon exterior parts of these two tubular members in such a manner as to produce, when same are positioned together in surface-contacting relation, a joint 28 which will place the bore 22 of the first tubular member 20 in properly spaced relation to the bore 26 of the second tubular member 24.

Figure 2:
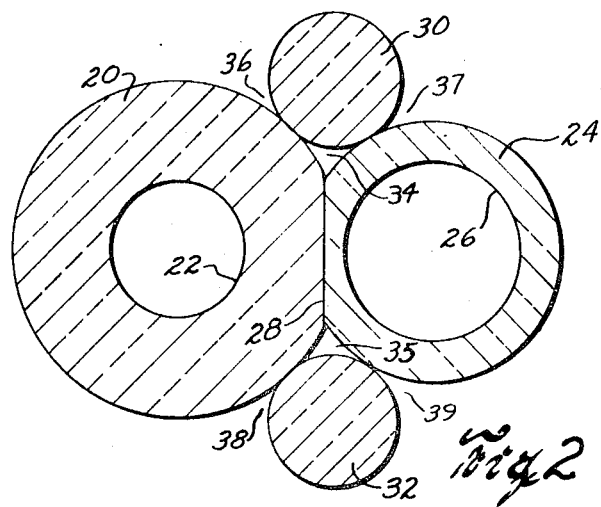
FIG. 2 is a cross-sectional view showing parts employed in carrying out method steps of the invention.

Thereafter, a pair of elongated filler rods 30 and 32 of glass of suitable smaller cross-sectional area and shape and of as near the same refractive index value as conveniently possible, but of appreciably lower melting characteristics than that of the members 20 and 24, is disposed and secured so that the two rods lie, respectively, in the two valleys 34 and 35 formed between the exterior side wall surface parts of the two tubular members 20 and 24 at opposite sides of the assembly and in contacting relation therewith, as clearly indicated in FIG. 2. The assembly of tubular rods 20 and 24 and smaller rods 30 and 32 shown in FIG. 2, may be, for example, initially of an appreciable cross-sectional size and suitable working length, and, for some purposes, the tubular member 20, for example, could be as much as two inches in diameter and twelve inches or so in length.

Thereafter, this assembly of elements, secured by wrappings of "Teflon" ribbon or the like at four or five spaced locations therealong and with or without a closely fitting rod of laser glass disposed within the bore 22, will be ssupended by one end in a suitable furnace and suitably heated at its opposite lower end. Vacuum means could be attached to the upper end at this time. This will cause the lower melting type of glass of the filler rods 30 and 32 to flow into the spaces or valleys 34 and 35 as or even before the lower end of the assembly is drawn down somewhat. The glass of lower melting characteristics will also flow into exterior spaces 36, 37, 38 and 39 formed between said filler rod and said tubular members. Thus, the result of this heating and drawing step will be that a fused-together structure much like that indicated in FIG. 3 will be effected, with the filler glass spread out and sagged into intimate contacting relation with wall parts of both of the tubular members, as indicated at 40. Note that spaces 34 and 35, particularly, will have completely disappeared. Also, it should be mentioned that, at this time, the cross-sectional configuration of the tubular members will be retained and that they will only be somewhat reduced in size. (Also, the rod of laser glass, if present, will likewise only be somewhat reduced in size.)

Figure 3:
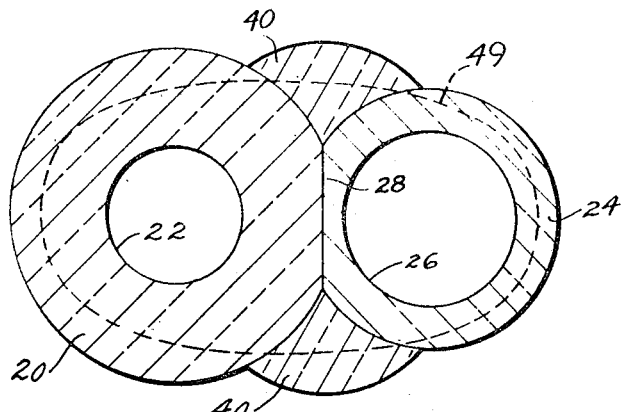
FIG. 3 is a cross-sectional view of a partly finished structure showing method steps of the invention.
Figure 4:
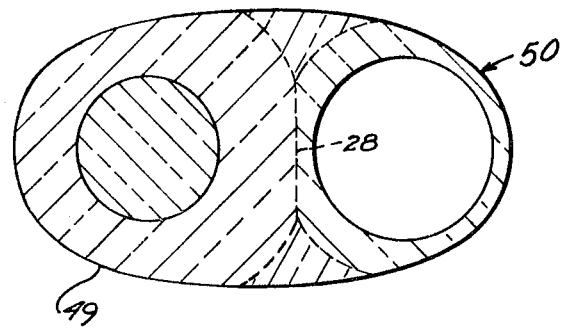
FIG. 4 is a cross-sectional view somewhat similar to FIG. 3 but showing a further step of the method of the invention.

Thereafter, by known grinding and polishing techniques, the excess material contained upon the outer surface parts of this fused-together assembly of FIG. 3, such as that indicated outwardly beyond the dotted line 49, will be removed to produce an intermediate member like that indicated at 50 in FIG. 4.

Figure 5:
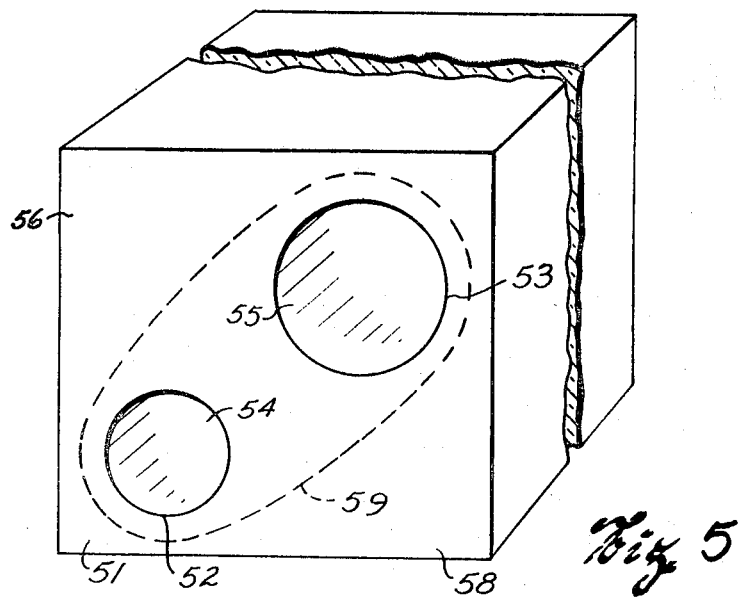
FIG. 5 is a perspective view showing a modified form of structure for use in carrying out method steps of the present invention.

In an alternative procedure, as suggested by a study of FIG. 5, a relatively large solid block of glass 51 of as much as 2½" square in cross-sectional dimensions, for example, and 6 or more inches in length, for forming the main body member of the laser structure will be provided. Within this block of glass is then bored two cylindrically-shaped holes 52 and 53 having diameters of predetermined related sizes so as to extend in substantially parallel relation to each other throughout the length of the block, said bores being carefully controlled as to the spacing therebetween and in reference to the sizes of said diameters. Of course, these related diameters and their common spacing will be adjusted in size while maintaining the proper ratios therebetween so as to utilize as much of the glass of said block as convenient and practical.

Thereafter, the exposed side wall surfaces of both of said bores will be ground and polished, by known techniques, so as to effect optically finished surfaces thereon, and such are indicated at 54 and 55. The next method step for the block will comprise grinding away the excess outer sidewall material of the block, such as that at 56 and 58 so as to provide an intermediate block of an outer desired cross-sectional contour shape much like that suggested by dotted line 59. Thereafter, the resulting unitary intermediate member will have its outer sidewall surface portions polished and, at that time, will closely approximate the outer peripheral shape desired for internally reflecting light with a minimum of reflections from one bore therein to the other.

A preferred cross-sectional shape for the sizeable intermediate member of FIG. 4 and also of FIG. 5 would be approximately that of an oval, or ellipse, or a modification thereof, having in mind, of course, that the shape desired will be one which will require a minimum of material for satisfying the structural needs thereof and will, at the same time, best reflect and direct the light with a minimum of internal reflections from one bore to the other, when produced by a flashtube medium therein.

Thereafter, a laser rod of only slightly smaller diameter than that of the bore 54, for instance, may be inserted into said intermediate member and the assembly, so formed, heated at its lower end while being suspended by the other end and while a vacuum is applied to said other end. The heated end of this sub-assembly is then drawn down to produce a materially extended component of materially reduced cross-sectional dimensions and while the rod of laser material contained therein is brought into good optical contact therewith and these glass parts fused together.

Instead of placing the laser rod within the large intermediate formed block of glass of FIGS. 4 or 5 before the first drawing-down step is performed, it would be possible, and at times more practical, to heat and draw down this formed block into a member of reduced intermediate cross-sectional size, reduced by a much as two-to-one or three-to-one, and to then insert a laser rod of suitable smaller size therein.

It has been found desirable, during such a heating and drawing operation which preferably would be effected in a vertical direction, to employ vacuum means attached to the upper end of the assembly, in known manner, to thereby effect a vacuum effect between the rod of laser glass and the surrounding component as the assembly is being drawn down to smaller size. The purpose of the vacuum is to remove as much of the air and gases as possible from locations between the adjacent surfaces of the rod and component. This drawing-down operation, additionally, has the advantage of producing a fire-polished surface condition or at least maintaining a good polished surface condition upon the exterior and interior surfaces of said component. At the same time, an interface will be formed between said laser rod and the glass of the main body member of good optical quality.

After such an intermediate component including the laser element has been produced, the assembly so effected may be again subjected at its lower end to a heating and drawing-down operation so as to further reduce the cross-sectional size of the component to the dimensions desired. Of course, at this time, a reduced component of any length desired may be cut from the elongated member so produced. While the method may be started by initially providing a sizeable block of glass and sizeable rod of laser glass, nevertheless, the steps of the method are such as to enable same to be reduced to an appreciably smaller cross-sectional size without loss of the proportions initially provided, and a reduction ratio of from as little as 2 or 3 to 1 to as much as 20 to 25 to 1 or even more may be employed.

In a finished component of unitary construction as described herein, the total cross-sectional area of the glass of the main body member will be kept as small as conveniently possible while still containing the laser rod, or fiber, and the flashtube bore of desired size immersed therein and while providing the good internal reflection conditions desired at the outer side walls for the light generated within the flashtube. As suggested in said earlier application, these side wall portions will be coated with a highly reflective layer of material such as silver, and even with a second outer coating of metal of good heat conductivity such as copper.

In an actual laser construction of the type already referred to and arranged for continuous operation, an acceptable workable size of laser assembly has been found to be as little as 6 inches in length and the elongated laser rod or fiber element therein has been in the neighborhood of 1 millimeter in diameter and while the elongated flashtube compartment has been approximately 2 millimeters in diameter. Such a construction arranged as a laser light generator using trivalent neodymium-doped barium crown laser glass has developed a laser output of $10^6$ watts at a 1.06 micron wavelength in 50 millijoule pulses at 10 pulses per second at room temperatures and for extended periods of time.

Other sizes of laser components, both of shorter and greater lengths, are possible while following the teachings of the invention and in keeping therewith various different diameters, both smaller and larger, for the laser elements for these components are likewise possible. Of course, the dimensions of the flashtube compartments of these components of different sizes would be adjusted accordingly.

It would, of course, be possible to perform the steps of heating and flowing the lower melting type glass of the filler rods 30 and 32 into spaces 34 and 35, to thereby produce the fused-together unitary structure of FIG. 3, without first providing the flat surfaces suggested in FIG. 2 by line 28. Also, it may be convenient at times to continuously force a stream of cooling air down through the bores 22 and 26 during the abovementioned filling-in operation. This operation will tend to prevent any material change in the shape of the cylindrical bores 22 and 26. Even filler glass of somewhat higher melting characteristics can be used successfully when such a forced air arrangement is used.

When the already-prepared intermediate member of glass formed from a drilled and finished solid block of glass or from fused-together rods and tubes of glass and having the laser glass rod inserted therein is to be heated and drawn down into a fused-together component of smaller cross-sectional size (and even if vacuum means is attached to one end so as to extract air from the space between the laser core glass and the surrounding cladding glass), it would be possible, if desired, to have a small hose "plugged" into the upper end of the flashtube bore portion of the member for forcing cooling air downwardly therethrough. This cooler air will tend to make the bore portion of the assembly a little more resistant to changes in cross-sectional shape thereof during the drawing-down operations.

Figure 6:
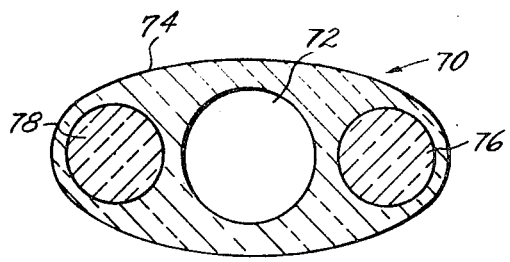
FIG. 6 is a cross-sectional view of a further modified form of component which may be made by following the method steps of the invention.

In FIG. 6 is shown a modified laser component 70 employing a single flashtube compartment 72 immersed in the glass 74 of the main body member as well as a pair of laser elements 76 and 78 immersed therein, and which component may be made by following the same method steps mentioned heretofore. In fact, even a different number of laser elements is also possible in a single component.

Ranges of related values for the laser core diameter $D_L$ for the compartment diameter $D_C$ and for the spacing S therebetween which may be employed together in a single laser component are as follows:

| | Units |
|---|---|
| Core diameter | 1 to 3 |
| Compartment diameter | 1 to 3 |
| Spacing between | ¼ to 1 |

Having described my invention, I claim:

1. The method of making components for use in forming laser structures having high optical efficiencies and good heat conductivity, said method comprising forming a quantity of light-transmitting glass of predetermined optical and physical characteristics into a unitary solid block-like member of appreciable cross-sectional area and greater length, forming by means of a boring operation a plurality of cylindrically-shaped bores of predetermined sizes in closely adjacent spaced and substantially parallel relation to one another in said block-like member so as to extend throughout the length thereof, the diameter of the largest of said bores being within a range of between one and three times the diameter of the smallest of said bores, and the spacing between adjacent bores being between one-fourth and one times the diameter of the smallest of said bores, grinding and polishing the side wall surface portions of said bores so as to have optically finished surfaces throughout the lengths thereof, grinding away the exterior side wall surface portions of said block-like member so as to remove excess material and form a continuous smoothly curved peripheral surface disposed in surrounding closely adjacent spaced relation to said bore, providing an optical finish upon said peripheral surface, forming a thin, elongated cylindrical element of glass selected from a family of glasses which will emit laser energy upon laser excitation and with said cylindrical element being of slightly smaller cross-sectional size than the size of one of said bores, providing an optically finished surface throughout the side wall surface portions of said cylindrical element, inserting said element within said one bore, heating an end portion of the assembly so formed and drawing same down to smaller desired cross-sectional dimensions while maintaining said related sizes and spacing and of a materially greater length, and severing from said drawn-down portion a unitary fused-together section of predetermined length to serve as a laser component comprising a thin, elongated main body member of light-transmitting glass having a thin, elongated element of laser glass immersed therein and an elongated flash tube compartment immersed therein and in closely adjacent spaced relation to said element of laser glass.

2. The method defined in claim 1 wherein said peripheral surface upon said main body member is so controlled during the forming and finishing thereof as to be approximately elliptical in cross-sectional shape.

3. The method defined in claim 1 wherein a suitable source of cooling medium is supplied to the upper end of said assembly in such a manner as to tend to cool interior surface portions of the bore unoccupied by laser glass during the heating and drawing-down of said assembly.

4. The method defined in claim 1 wherein a suitable source of vacuum is attached to a part of the upper end of said assembly in such a manner as to tend to extract all gases only from the space between said laser element and the glass of the main body member surrounding said laser element during the heating and drawing-down of said assembly but without materially changing the related cross-sectional proportions of said laser element, said bore and said main body member during said drawing-down operation.

References Cited

UNITED STATES PATENTS

| | | | |
|---|---|---|---|
| 1,926,552 | 9/1933 | Morgan | 65—4 XR |
| 2,608,722 | 9/1952 | Stuetzer | 65—4 XR |
| 2,752,731 | 7/1956 | Altosaar | 65—4 XR |
| 3,350,183 | 10/1967 | Siegmund et al. | 65—38 XR |

S. LEON BASHORE, Acting Primary Examiner

FRANK W. MIGA, Assistant Examiner

U.S. Cl. X.R.

65—13, 54, 61, 37, 38, 39, 108, 110, 155, 156, 192; 331—94.5; 350—175